(12) United States Patent
Katou et al.

(10) Patent No.: US 6,913,106 B2
(45) Date of Patent: Jul. 5, 2005

(54) VEHICLE STEERING SYSTEM

(75) Inventors: Yuusuke Katou, Kawasaki (JP);
Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/642,196

(22) Filed: Aug. 18, 2003

(65) Prior Publication Data

US 2004/0040778 A1 Mar. 4, 2004

(30) Foreign Application Priority Data

Aug. 30, 2002 (JP) ........................................ 2002-255072

(51) Int. Cl.[7] .............................................. B62D 5/04
(52) U.S. Cl. ...................................... 180/402; 180/407
(58) Field of Search ................................. 180/402, 407

(56) References Cited

U.S. PATENT DOCUMENTS

| | | | | |
|---|---|---|---|---|
| 4,741,409 A | * | 5/1988 | Westercamp et al. | ........ 180/413 |
| 5,828,972 A | | 10/1998 | Asanuma et al. | |
| 6,176,341 B1 | * | 1/2001 | Ansari | ......................... 180/402 |
| 6,208,923 B1 | | 3/2001 | Hommel | |
| 6,345,681 B1 | * | 2/2002 | Hackl et al. | .................. 180/402 |
| 6,548,969 B2 | * | 4/2003 | Ewbank et al. | ................ 318/34 |
| 6,622,813 B2 | * | 9/2003 | Matz et al. | ................... 180/411 |
| 6,681,881 B2 | * | 1/2004 | Andonian et al. | ........... 180/402 |
| 6,728,615 | * | 4/2004 | Yao et al. | ....................... 701/41 |
| 6,776,252 | * | 8/2004 | Andonian et al. | ........... 180/402 |
| 2004/0026158 | * | 2/2004 | Rieth et al. | ................... 180/402 |

FOREIGN PATENT DOCUMENTS

| | | |
|---|---|---|
| DE | 42 32 256 A1 | 4/1993 |
| EP | 1 219 525 A2 | 7/2002 |
| JP | 10-329743 A | 12/1998 |
| JP | 2000-043749 A | 2/2000 |
| JP | 2000-053012 A | 2/2000 |

* cited by examiner

*Primary Examiner*—Kevin Hurley
(74) *Attorney, Agent, or Firm*—Foley & Lardner LLP

(57) ABSTRACT

In a vehicle steering system, a steering mechanism includes an input section, and a steering section mechanically separated from the input section, and arranged to steer a vehicle. An actuating section includes a plurality of drive units for producing an actual torque to the steering mechanism. A controlling section includes a plurality of control units to control the drive units, respectively, in accordance with a common torque share calculated by one of the control units.

17 Claims, 7 Drawing Sheets

US 6,913,106 B2

VEHICLE STEERING SYSTEM

BACKGROUND OF THE INVENTION

The present invention relates to vehicle steering apparatus and process for steering a vehicle with an actuator in response to a driver's steering input.

In a steer-by-wire steering system, a steering gear mechanism for varying a steer angle of steerable wheels of a vehicle is separated from a steering wheel operated by a driver. An angle sensor senses a steering wheel angle with an encoder, and a controller varies the wheel steer angle with an actuator in accordance with the sensed steering wheel angle.

A steering system of such a type of earlier technology is composed of two or more subsystems each including a steering shaft motor for actuating a steering gear mechanism such as a rack and pinion steering mechanism, and a steering controller for controlling the steering shaft motor in accordance with an angular displacement of a steering shaft sensed by an angle sensor, and a desired target steering angle.

SUMMARY OF THE INVENTION

In such a steering system, however, each subsystem senses a control quantity, and the control quantity for the steering shaft motor might differ from subsystem to subsystem because of mechanical displacement errors, and electric sensing errors such as sensor errors among the angle sensors. Therefore, the subsystems might drive the respective steering shaft motors inconsistently with different control quantities, and the steering shaft motors might interfere with one another, and might produce torques in opposite directions, so that the drive currents for the steering shaft motors might be increased continuously.

It is, therefore, an object of the present invention to provide vehicle steering apparatus and process for driving a plurality of steering shaft motors with little or no interference.

According to one aspect of the present invention, a vehicle steering system comprises: a steering mechanism including an input section, and a steering section which is mechanically separated from the input section, and arranged to steer a vehicle in accordance with a steering input quantity of the input section; an actuating section to impart an actual torque to the steering mechanism, the actuating section including a plurality of drive units to produce the actual torque; and a controlling section to control the actuating section to achieve a target torque with the drive units, the controlling section including a plurality of control units to control the drive units, respectively, in accordance with a common torque share calculated by one of the control units.

According to another aspect of the invention, a vehicle steering control process for controlling each of steering torques produced with a plurality of drive units, to achieve a target torque in response to a steering input quantity, comprises: a first process element of calculating a common torque share when an assigned role is to serve as a representative unit; a second process element of receiving the common torque share when the assigned role is to serve as a non-representative unit; and a third process element of controlling the steering torque in accordance with the common torque share.

According to still another aspect of the invention, vehicle steering control apparatus for controlling an actual torque for steering a vehicle with a plurality of subsystems to achieve a target torque in response to a driver's steering input quantity, the vehicle steering control apparatus comprises: means for selecting one of the subsystems as a representative unit, and leaving the remainder as a non-representative unit; means for causing the representative unit to calculate a common torque share in accordance with the target torque; means for causing the non-representative unit to receive the common torque share from the representative unit; and means for producing the actual torque in response to the driver's steering input for steering the vehicle, by causing each unit to produce a torque in accordance with the common torque share.

DETAILED DESCRIPTION OF THE INVENTION

Figure 1:
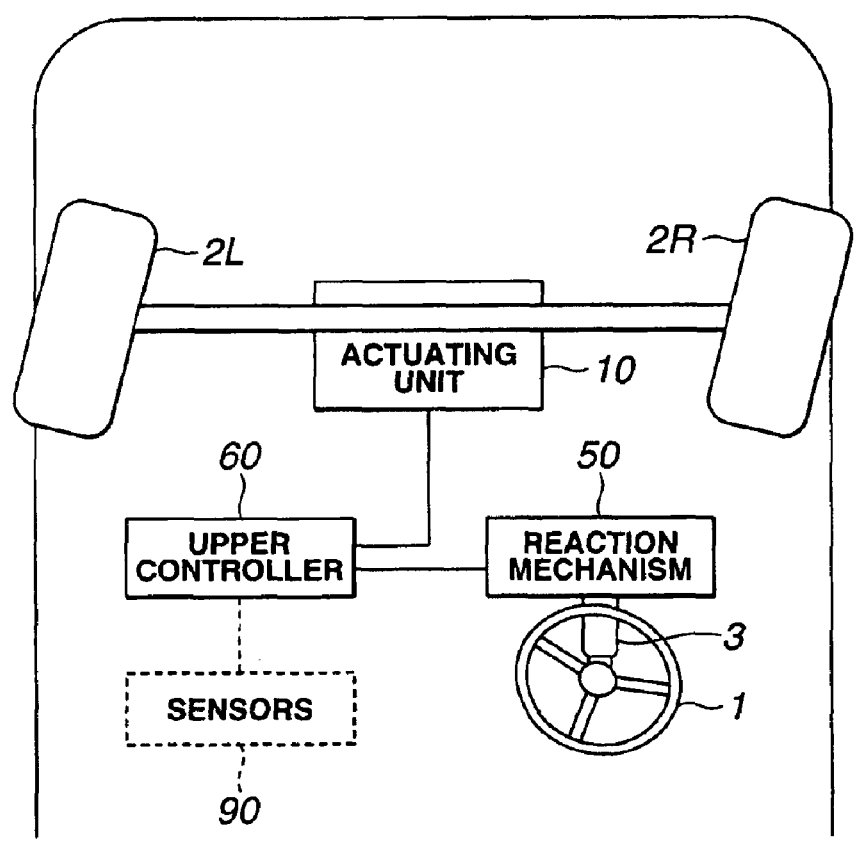
FIG. 1 is a schematic view showing a steering system according to a first embodiment of the present invention.

FIG. 1 schematically shows a vehicle equipped with a steering system according to a first embodiment of the present invention.

A steering mechanism of the vehicle is composed of two separate sections which are mechanically separated from each other. The first section is an input section including a steering wheel 1, and the second section is a steering (gear) section including a steering gear mechanism 5 (shown in FIG. 2). The input section further includes a reaction unit 50 for providing a steering reaction force to steering wheel 1.

A steering actuating unit or system 10 according to the first embodiment is provided for the steering section (5) of the steering mechanism. Steering actuating system 10 is mechanically separated from steering wheel 1. Actuating system 10 of this example is composed of a plurality of subsystems SUBa, SUBb and SUBc which are three in number in this example. Each subsystem includes a drive unit including a steering shaft motor 11a, 11b or 11c, and a control unit for controlling the drive unit. The drive units of the subsystems serve as an actuating section (11a~11c) for imparting an actual torque to steering gear section 5 of the steering mechanism.

As reaction unit 50, it is possible to employ the construction of a known mechanism for providing a steering reaction. In this example, an upper controller 60 calculates a target reaction torque corresponding to a steering torque in accordance with operating conditions sensed by sensors 90; and the reaction unit 50 provides a steering reaction toque corresponding to the calculated target reaction torque, to a steering column shaft 3 of steering wheel 1, by driving a reaction producing motor. In this example, the target reaction torque is calculated in accordance with a displacement quantity of a steer shaft in actuating unit 10 and a vehicle speed sensed by a vehicle speed sensor included in the sensors 90. Accordingly, the driver can feel the reaction force corresponding to the steering quantity.

Figure 2:
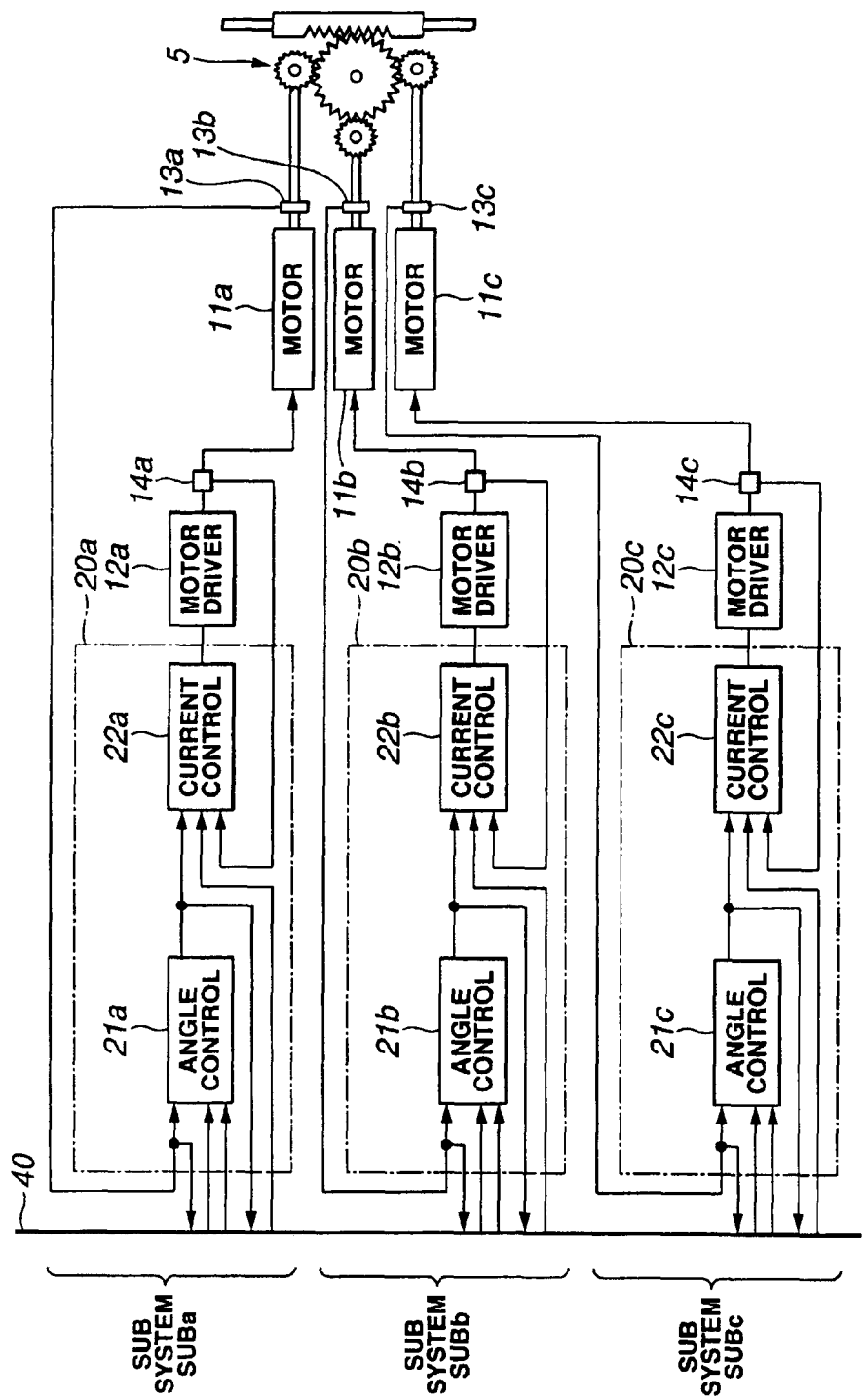
FIG. 2 is a schematic view showing a steering actuating system of the steering system according to the first embodiment.

Steering gear mechanism 5 of this example is a rack and pinion steering mechanism as shown in FIG. 2. Steering actuating unit or system 10 of this example is composed of three subsystems SUBa, SUBb and SUBc each for driving the corresponding one of steering shaft motors 11a, 11b and 11c to drive the pinion of rack and pinion steering mechanism 5. Subsystems SUBa, SUBb and SUBc are substantially identical to one another in construction, and connected with one another and with upper controller 60 by a communication bus 40 serving as communication line, so that information can be exchanged among the subsystems and upper controller 60. Each of the subsystems serves as a control unit, and the subsystems and upper controller 60 serves as a controlling section to control the actuating section to achieve a desired target torque with the drive units (11a~11c) of the actuating section.

Subsystem SUBa includes steering shaft motor 11a for driving steering gear mechanism 5, a motor driver 12a for driving the corresponding steering shaft motor 11a, an angle sensor 13a for sensing a steering angle and a steering angular speed of a steering shaft member for steering mechanism 5, a current sensor 14a for sensing a current supplied to steering shaft motor 11a, and a steering shaft angle controller 20a for controlling motor driver 12a. In accordance with the sensor signal from angle sensor 13a, a target steering angle command from upper controller 60, a control angle command from another subsystem, and the sensor signal of current sensor 14a, the angle controller 20a calculates a current command for steering shaft motor 11a, and delivers current corresponding to the current command, to motor driver 12a. Angle controller 20a includes an angle control operational section 21a and a current control operational section 22a.

Steering motor 11a is connected with steering gear mechanism 5 through a clutch mechanism capable of disconnecting the drive path between steering motor 11a and steering gear mechanism 5. When a malfunction is detected in steering motor 11a, angle controller 20a or other component in subsystem SUBa, this control system stops the operation of driving steering motor 11a, and disconnects steering motor 11a of subsystem SUBa, from steering gear mechanism 5 by disengaging the clutch mechanism.

Angle control operational section 21a of angle controller 20a performs operations by using the steering angle and angular speed sensed by angle sensor 13a, the target steering angle command of upper controller 60, the operating states of the other subsystems as to whether the subsystems are in normal operating conditions, and the predetermined order of priority of subsystems SUBa, SUBb and SUBc. If the priority level of its own subsystem SUBa is the highest among all the subsystems, the angle control operational section 21a calculates a control quantity for the steer angle in accordance with the input information items, and supplies the result of the calculation as the control steering angle command, through communication bus 40, to the other subsystems.

Current control operational section 22a performs operations to control the current in accordance with the control steering angle calculated by angle control operational section 21a or the control steering angle obtained from one of the other subsystems through communication bus 40, and the sensor signal from current sensor 14a.

The order of priority is determined, in this example, so that the highest priority is given to the subsystem whose steering angle sensed by its angle sensor is closest to the average among the sensed steering angles of the three subsystems SUBa~SUBc.

Though the above explanation is directed to the first subsystem SUBa, the second and third subsystems SUBb and SUBc are substantially identical in construction and operation, to the first subsystem SUBa.

Figure 3:
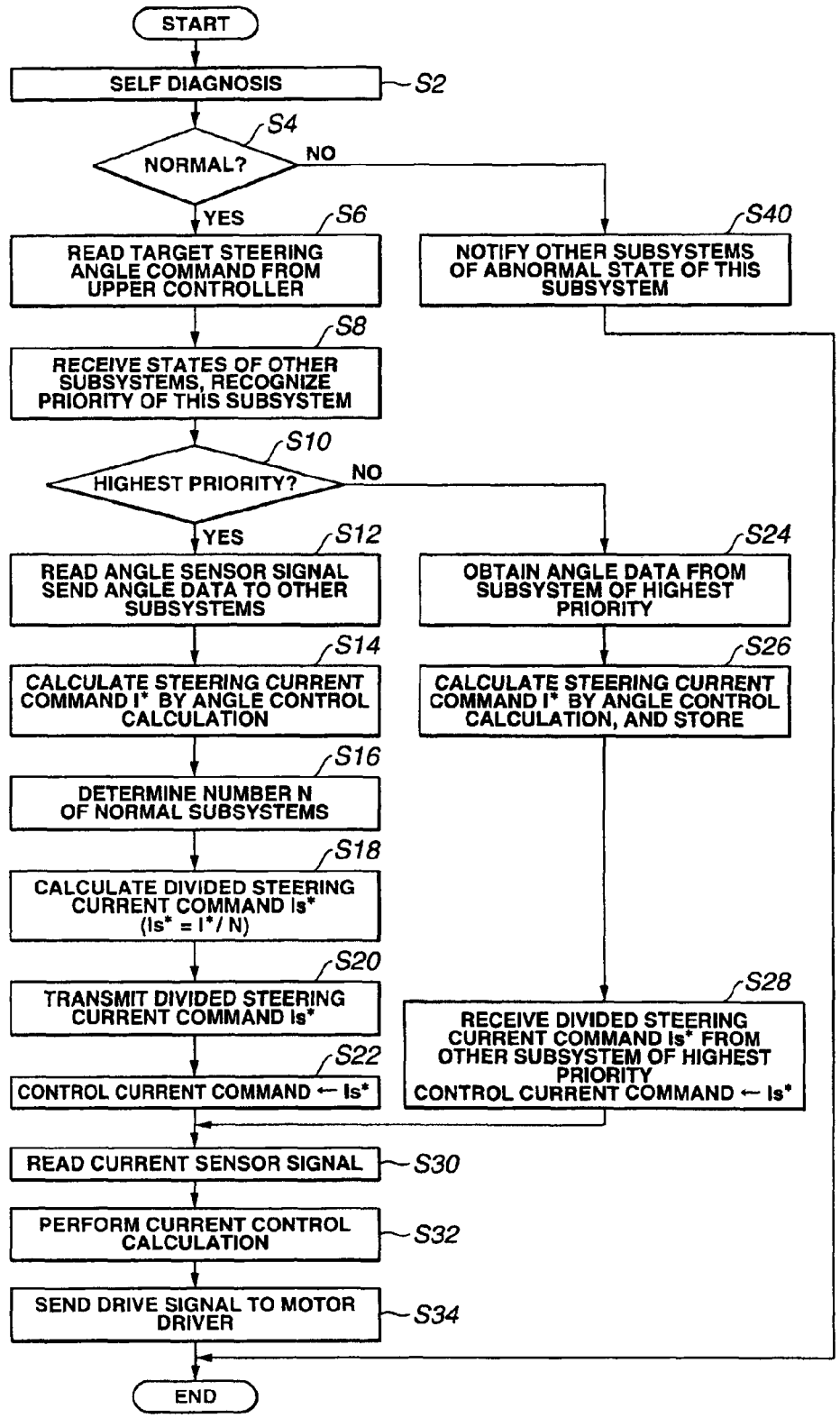
FIG. 3 is a flow chart showing a steering shaft angle control process performed by a steering shaft angle controller of each subsystem shown in FIG. 2.

FIG. 3 shows a steering shaft angle control process performed by steering shaft angle controller 20a according to this embodiment of the invention. The process is the same among the three subsystems SUBa~SUBc. The following explanation is directed only to subsystem SUBa. Angle controller 20a is arranged to perform the process at regular intervals of a predetermined cycle time.

At step S2, controller 20a performs a self diagnostic operation. In this example, when an ignition key of the vehicle is inserted, the control system calculates a current command to vary the steering angle by a unit angle, in accordance with a predetermined self-diagnostic steering angle command (set equal to a unit angle, for example), and the steering angle from angle sensor 13a, and drives the motor 11a by delivering current corresponding to the calculated current command, to motor driver 12a. Then, controller 20a examines the sensor signal of angle sensor 13a to determine whether the steering operation is performed in conformity with the command. Then, after a start of the steering shaft angle control process, this control system performs a self-diagnostic operation by monitoring a rate of change of the steering shaft angle sensed by angle sensor 13a, or a change of the steering shaft angle during one cycle, each time the this steering shaft angle control process is performed at regular time intervals of the cycle time.

Then, at step S4, controller 20a checks the result of the self-diagnostic operation and thereby determines whether the subsystem SUBa is normal, or not. When subsystem SUBa is judged to be normal, controller 20a proceeds to step S6, and reads the target steering angle command from upper controller 60 through communication bus 40. Then, at a next step S8, controller 20a reads information on the operating states of the other subsystems SUBb and SUBc, and examines whether the priority of its own subsystem SUBa is the highest or not, by examining the information on the operating states of the other subsystems, and the preset order of priority. When the preset order of priority is SUBa, SUBb, SUBc, then controller 20a judges that subsystem SUBa is the highest in the priority. When the preset order of priority is SUBc, SUBa, SUBb, then controller 20a normally judges that subsystem SUBa is not highest in priority. If, however, subsystem SUBc is considered to be in the abnormal state, from the information on the operating states of the other subsystems, then controller 20a judges that subsystem SUBa is the highest in priority.

When the judgment is that the priority of subsystem SUBa is the highest, then controller 20a proceeds from step S10 to step S12. At step S12, controller 20a reads the sensor signal of angle sensor 13a and transmits the obtained data to the other subsystems SUBb and SUBc.

At step S14 following step S12, controller 20a calculates a current command I* by performing an angle control calculation. In this example, a steering torque to be provided to the steering mechanism 5 to bring the actual steering angle toward the angle specified as the target steering angle command is calculated in accordance with internal variables successively updated in the current command calculating operation. In this example, the internal variables includes the target steering angle command obtained at step S6, the steering angle and steering angular speed obtained at step 512, and the previous value of the steering current command I*. From the thus-calculated steering torque, controller 20a calculates the steering current command I* to achieve this steering torque. The angle control calculation is performed at steps S12 and S14.

Then, at step S16, controller 20a counts the subsystems in the normal state in accordance with the operating states of the subsystems ascertained at step S8, and determines the number (N) of the subsystems functioning properly in the normal state. At a next step S18, controller 20a determines a divided steering current command Is* for each normal subsystem by dividing the steering current command I* determined at step S14, by the number N of the normal subsystems determined at step S16. Then, at step S20, controller 20a transmits the divided steering current command Is*, to the other normal subsystems SUBb and SUBc through communication bus 40. At step S22, controller 20a sets the divided steering current command Is* as the control current command.

When the judgment of step S10 is that the priority of subsystem SUBa is not highest, then controller 20a proceeds to step S24, and reads the angle data from the other subsystem SUBb or SUBc of the highest priority level.

At step S26, controller 20a calculates the current command I* by performing the angle control calculation like step S14. In this example, the steering torque to be provided to the steering mechanism 5 to bring the steering angle toward the angle specified as the target steering angle command is calculated in accordance with the steering angle data obtained from the highest priority subsystem at step S24, and the target steering angle command obtained from upper controller 60 at step S6. From the thus-calculated steering torque, controller 20a calculates the steering current command I* to achieve this steering torque. Controller 20a stores, in a predetermined memory region, the steering current command I* thus calculated in its own subsystem SUBa.

At step S28, controller 20a reads, through communication bus 40, the divided steering current command Is* calculated by the other subsystem of the highest priority, and sets this divided steering current command Is* as the control current command.

After the control current command is determined in this way at step S22 or S28, controller 20a proceeds to step S30, and reads the supply current to steering shaft motor 11a, sensed by current sensor 14a. At step S32 next to S30, controller 20a performs a current control calculation to bring the motor supply current obtained at step S30, closer to the control current command, and delivers the drive signal corresponding to the control current command, to motor driver 12a at step S34. Then, controller 20a terminates this process. The current control calculating operation is constituted by the operations of steps S30 and S32.

In response to the drive signal from controller 20a, motor driver 12a drives steering shaft motor 11a, and hence steering shaft motor 11a imparts the steering torque to steering gear mechanism 5.

If subsystem SUBa is not in the normal state, controller 20a proceeds from step S4 to step S40, and notifies the other subsystems SUBb and SUbc and upper controller 60 through communication bus 40 that subsystem SUBa is not in the normal state. Then, controller 20a terminates the control process of FIG. 3.

The control system is operated as follows: Upper controller 60 receives a sensor signal from a steering wheel angle sensor (included in sensors 90) for sensing a steering (input) quantity of steering wheel 1 operated by the driver, and calculates the target steering angle command by a known control process in accordance with the sensed steering input quantity. The calculated target steering angle command is delivered to steering actuating unit 10. Moreover, upper controller 60 calculates a target reaction torque corresponding to the steering torque by a known process in accordance with the steering shaft displacement in steering unit 10, and the vehicle speed, and drives the reacting producing motor in reaction unit 50 in accordance with the target reaction torque. In response to this, reaction unit 50 imparts a reaction torque corresponding to the steering torque, to the column shaft 3 of steering wheel 1. The driver can feel the reaction torque corresponding to the steering quantity.

Each of subsystems SUBa, SUBb and SUBc of steering actuating unit 10 performs the steering angle control process. When all the subsystems are functioning properly; each subsystem proceeds from step S2, through step S4, to step S6; reads the target steering angle command from upper controller 60 at step S6; obtains the information on the operating states of the other subsystems; and recognizes the priority level of its own subsystem at step S8 by checking the operating states of the other subsystems.

When, for example, the order of priority dictated from upper controller 60 is SUBa, SUBb, SUBc, and all the subsystems are normal, then the subsystem SUBa recognizes its priority to be the highest, the subsystem SUBb recognizes its priority to be the second highest, and the subsystem SUBc recognizes its priority to be the lowest.

In subsystem SUBa of the highest priority level, controller 20a proceeds from step S10 to step S12, reads the angle data from angle sensor 13a, and sends the angle data to the other subsystems through communication bus 40. Subsystem SUBa further proceeds from step S12 to step S14, calculates the steering torque for steering gear mechanism 5 to control the actual steering angle to the target steering command, in accordance with the target steering command supplied from upper controller 60 and the angle data obtained at step S12, and calculates the steering current command I* to achieve this steering torque. The steering current command I* calculated by subsystem SUBa is expressed as Ia* with a subscript denoting the subsystem by which the steering current command is calculated. The steering current command I* serves as a control command quantity.

All the subsystems are normal in this example, so that the number N of the normal subsystems is equal to "3" (at S16). Therefore, the divided steering current command Is* per subsystem (corresponding to a common control share) is determined by dividing steering current command Ia* by "3" (at S18), and the divided steering current command Is* is sent to the other subsystems SUBb and SUBc through communication bus 40 (at S20). The divided steering current command Is* calculated by subsystem SUBa is expressed as Isa* with a subscript denoting the subsystem by which the divided steering current command is calculated.

Subsystem SUBa uses the thus-calculated divided steering current command Isa* as control current command (at S22), and delivers, to motor driver 12a, the drive signal determined by the current control calculation to control the supply current for steering shaft motor 11a, sensed by current sensor 14a, to the control current command set equal to divided steering current command Isa* (at S30~S34).

On the other hand, subsystem SUBb proceds from step S10 to step S24 since the priority of subsystem SUBb is not the highest. Accordingly, subsystem SUBb obtains the angle data from angle sensor 13a from subsystem SUBa; calculates the steering current command Ib* in accordance with the thus-obtained angle data; and stores the steering current command Ib* in the predetermined memory region (at S26).

Then, at step S28, subsystem SUBb reads the divided steering current command Isa* determined in subsystem SUBa, and sets this command Isa* as control current command of subsystem SUBb. Then, subsystem SUBb reads the current sensed by current sensor 14b, performs the current control calculation to control the current supplied to steering shaft motor 11b, sensed by current sensor 14b, to the control current command set equal to the divided steering current command Isa* calculated by subsystem SUBa, and delivers the drive signal determined by the current control calculation, to motor driver 12b (at S30~S34).

Similarly, subsystem SUBc obtains the angle data from angle sensor 13a from subsystem SUBa of the highest priority; calculates the steering current command Ic* in accordance with the thus-obtained angle data; and stores the steering current command Ic* in the predetermined memory region (at S24 and S26). Furthermore, subsystem SUBc reads the divided steering current command Isa* determined in subsystem SUBa, and sets this command Isa* as control current command. Then, subsystem SUBc reads the current sensed by current sensor 14c, performs the current control calculation to control the current supplied to steering shaft motor 11c, sensed by current sensor 14c, to the control current command set equal to the divided steering current command Isa* calculated by subsystem SUBa, and delivers the drive signal determined by the current control calculation, to motor driver 12c (at S30~S34).

Figure 4:
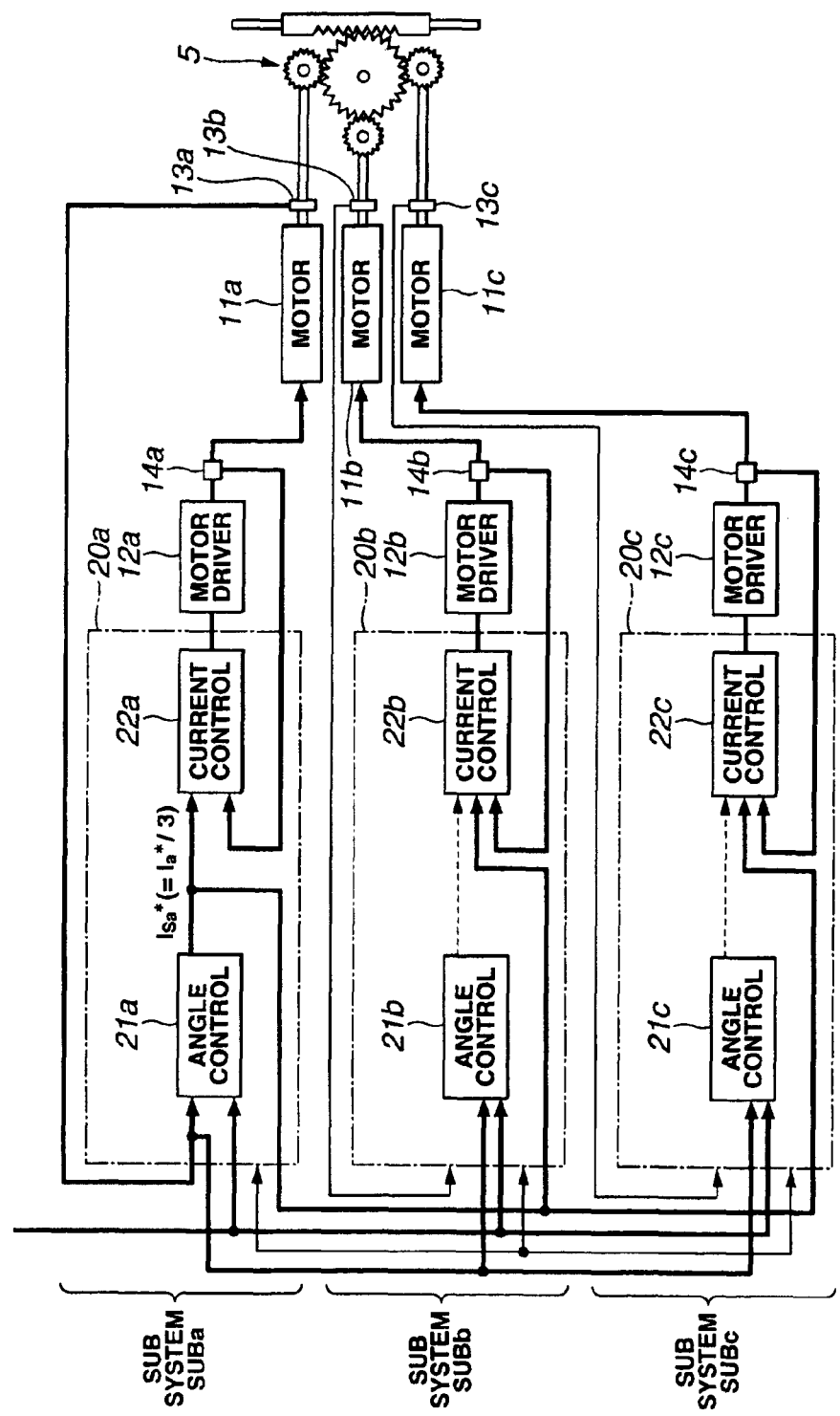
FIG. 4 is a schematic view of the steering actuating system of FIG. 2 for illustrating the flow of signals in the normal state.

FIG. 4 illustrates the flow of signals among subsystems SUBa, SUBb and SUBc. Subsystem SUBa calculates the divided current command Isa*, and subsystems SUBb and SUBc receive the divided current command Isa* from subsystem SUBa through communication bus 40. The steering shaft motors 11a~11c are controlled in accordance with the divided current command Isa* and the sensor signals of angle sensors 13a~13c.

Therefore, motor drivers 12a~12c of subsystems SUBa~SUBc respectively drive the steering shaft motors 11a~11c so that the current supplied to each motor is brought closer to the divided current command Isa*. Therefore, all the motors 11a~11c are so driven as to produce torques of the same magnitude in the same rotational direction.

Figure 5:
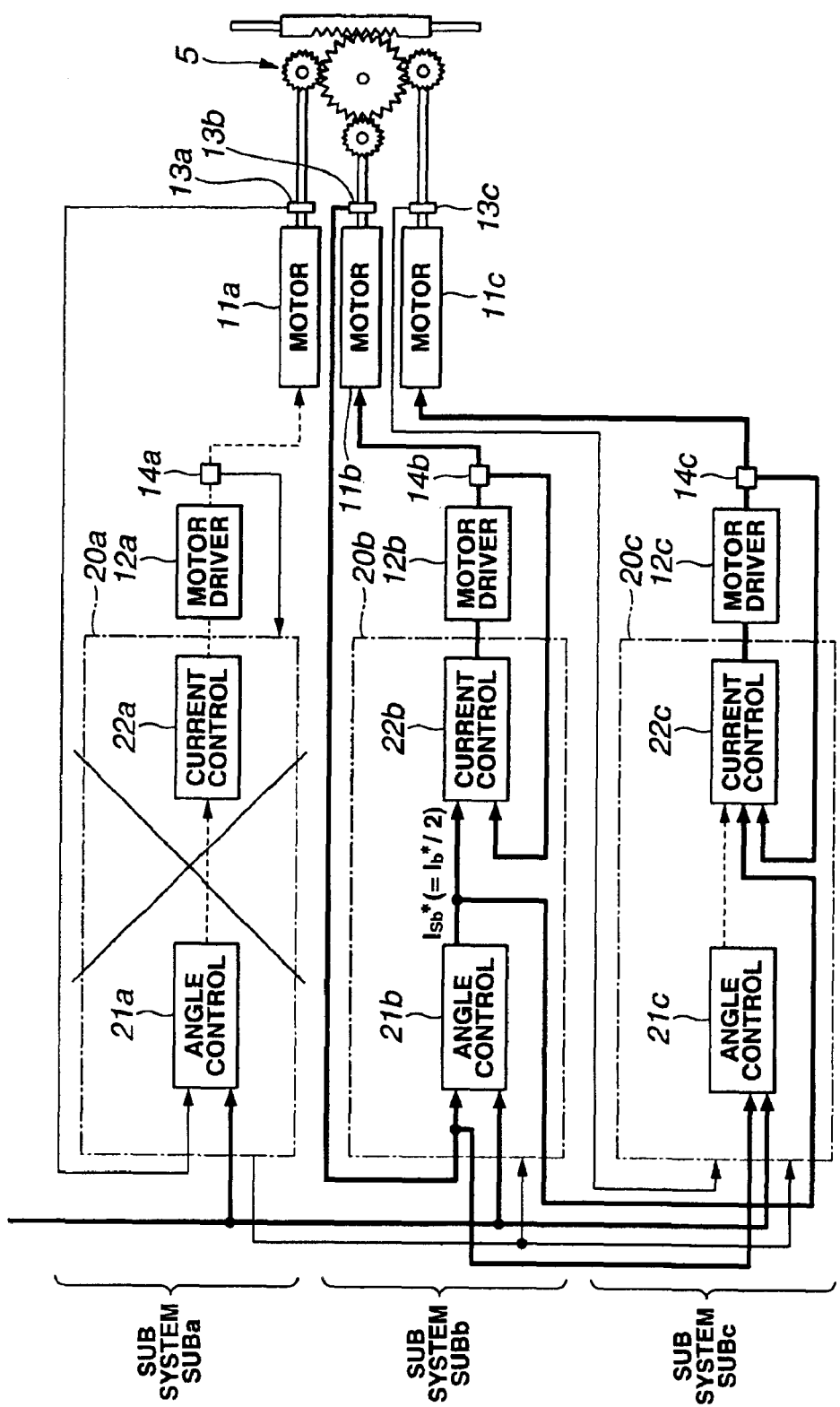
FIG. 5 is a schematic view of the steering actuating system of FIG. 2 for illustrating the flow of signals in the state in which a steering shaft angle controller 20a is not functioning properly.

If a malfunction occurs in the highest priority subsystem SUBa, as shown in FIG. 5, the subsystem SUBa realizes its own abnormality by the self diagnosis, proceeds from step S4 to step S40, and notifies the other subsystems SUBb and SUBc of the abnormal state of subsystem SUBa, through communication bus 40. Thereafter, the abnormal subsystem SUBa repeats the operations of steps S2, S4 and S40, and holds the steering shaft motor 11a in an inoperative state without driving the motor 11a until a judgment of the self diagnosis that subsystem SUBa is normal.

On the other hand, the subsystem SUBb remaining normal proceeds from step S2, through step S4 to step S6, reads the target steering angle command from upper controller 60, and ascertains the priority level of subsystem SUBb at S8. In this case, subsystem SUBb recognizes that the priority of subsystem SUBb is the highest, from the information that subsystem SUBa is not normal, and the order of priority preliminarily determined by upper controller 60.

Therefore, subsystem-SUBb proceeds from step S8, through S10, to step S12; sends the sensor signal of angle sensor 12b to the remaining subsystem SUBc; calculates the steering current command Ib* in accordance with the sensor signal of angle sensor 12b; calculates the divided steering current command Isb* by dividing the steering current command Ib* by the number ("2") of the normal subsystems; sets the thus-calculated divided steering current command Isb* as the control current command; and notifies the remaining normal subsystem SUBc of the divided steering current command Isb*. In accordance with the divided steering current command Isb* and the sensor signal from current sensor 14b, subsystem SUBb performs the current control calculation, and drives steering shaft motor 11b.

Subsystem SUBc proceeds from step S10 to step S24; receives the angle data of angle sensor 12b from the highest priority subsystem SUBb; calculates the steering current command Ic* in accordance with the sensor signal of angle sensor 12b; stores the steering current command Ic*; receives the divided current command Isb* from subsystem SUBb; performs the current control calculation in accordance with the divided steering current command Isb* and the sensor signal from current sensor 14c; and drives steering shaft motor 11c.

Therefore, steering shaft motors 11b and 11c are controlled, on the basis of the same divided current command Isb*, so as to produce torques of the same magnitude in the same rotational direction. Since subsystem SUBa is not functioning properly, the control system produces the steering torque only with the two motors 11b and 11c, excluding the motor 11a of the abnormal subsystem SUBa. However, the steering current command Ib* is divided by two, and the result is set as the divided current command Isb*. Therefore, the control system can produce the steering torque corresponding to the steering current command Ib* with the two motors 11b and 11c, and control the actual steer angle to the target steering angle command properly.

Figure 6:
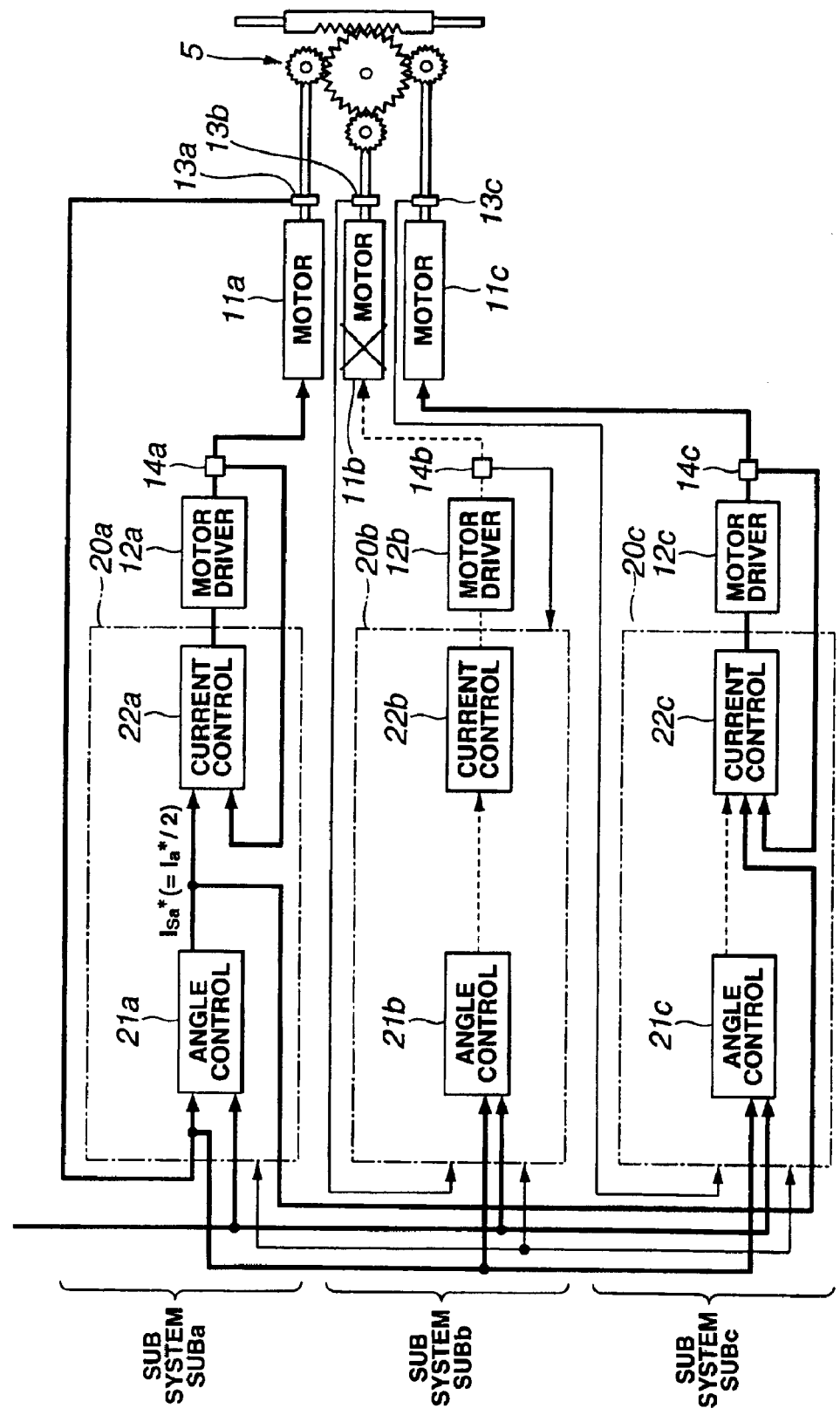
FIG. 6 is a schematic view of the steering actuating system of FIG. 2 for illustrating the flow of signals in the state in which a steering shaft motor 11b is not functioning properly.

If, for example, a malfunction occurs in steering shaft motor 11b of subsystem SUBb, as shown in FIG. 6, while the other subsystems remain normal, then the subsystem SUBb detects the malfunction of motor 11b by the self diagnosis of step S2, proceeds through step S4 to step S40, and notifies the other subsystems, of the abnormal state of subsystem SUBb.

Subsystem SUBa calculates the steering current command Ia* as in the above-mentioned example, in accordance with the sensor signal of angle sensor 13a and the target steering angle command. In this case, however, the number of the normal subsystems SUBa and SUBc is two, and the divided steering current command Isa* is determined by dividing the steering current command Ia* by two. Subsystem SUBc is notified of the abnormality of subsystem SUBb, but recognizes that the priority of subsystem SUBa is still the highest. Therefore, subsystem SUBc drives steering shaft motor 11c in accordance with the divided steering current command Isa* sent from subsystem SUBa.

If subsystem SUBa becomes abnormal in addition to subsystem SUBb, then subsystem SUBc judges that its own priority is the highest since the higher rank subsystems SUBa and SUBb are both abnormal, and calculates the steering current command Ic* in accordance with the sensor signal of angle sensor 13c and the target steering angle command from upper controller 60. Since the number of the normal subsystem is equal to one, the subsystem SUBc sets the divided steering current command Isc* equal to Ic*, and drives the steering shaft motor 11c in accordance with the thus-determined divided current command Isc*. In this case, the steering torque is produced only by motor 11c.

In this way, one of the subsystems acts as a representative subsystem or representative unit, and calculates the divided steering current command Is* as a variable representing the common torque share. The remaining subsystem or subsystems serve as non-representative subsystem or unit, and control the respective steering shaft motors on the basis of divided steering current command Is* determined by the representative unit. Thus, the subsystems can control the respective motors in the same direction with the same torque without undesired interferences.

Even if one of the subsystems becomes abnormal, the subsystems remaining normal can calculate the divided steering current command adequately, and control the motors of the remaining subsystems adequately by dividing the control command quantity by the number of the normal subsystems. In general, actuating system 10 is installed at a location near the exhaust manifold or exhaust pipe, and steering shaft motors 11a~11c are susceptible to adverse influence such as overheating. According to this embodiment, however, the vehicle steering system can continue producing the steering torque properly even if there is some malfunction in one or more of the motors, and by so doing the system can make more effective use of the redundancy.

The steering current command must be calculated by using values of various internal variables used in the previous calculation of the steering current command. However, each of the non-representative subsystems in this embodiment receives the angle data from the representative subsystem of the highest priority, and determines the steering current command I* in accordance with the angle data supplied from the representative unit. Therefore, each non-representative subsystem can start the calculation of the steering current command and the common torque share, quickly and smoothly if the non-representative subsystem is required to take over the role of the representative subsystem. Each non-representative subsystem is arranged to determine the steering current command I* by using the angle data from the representative subsystem. Therefore, the steering current command I* can be performed directly without changing the internal variables.

In the illustrated example, the number of subsystems (SUBa, SUBb and SUBc) is three. However, the number of subsystems is not limited to three. The number of subsystems may be two or equal to or greater than four. In the illustrated example, each of the angle control calculating sections 21a~21c calculates the steering current command I* representing the desired current, and the common torque share is in the form of the divided steering current command Is*. However, the present invention is not limited to this. Each of angle control calculating sections 21a~21c may be arranged to calculate a torque command representing a desired torque to be supplied to the steering mechanism. In this case, a divided torque command serving as the common torque share is determined by dividing the torque command calculated by the subsystem of the highest priority, by the number of the normal subsystems. Each of current control operating sections 22a~22c controls the corresponding steering shaft motor 11a, 11b or 11c, in accordance with the divided torque command and the current sensed by the current sensor.

Figure 7:
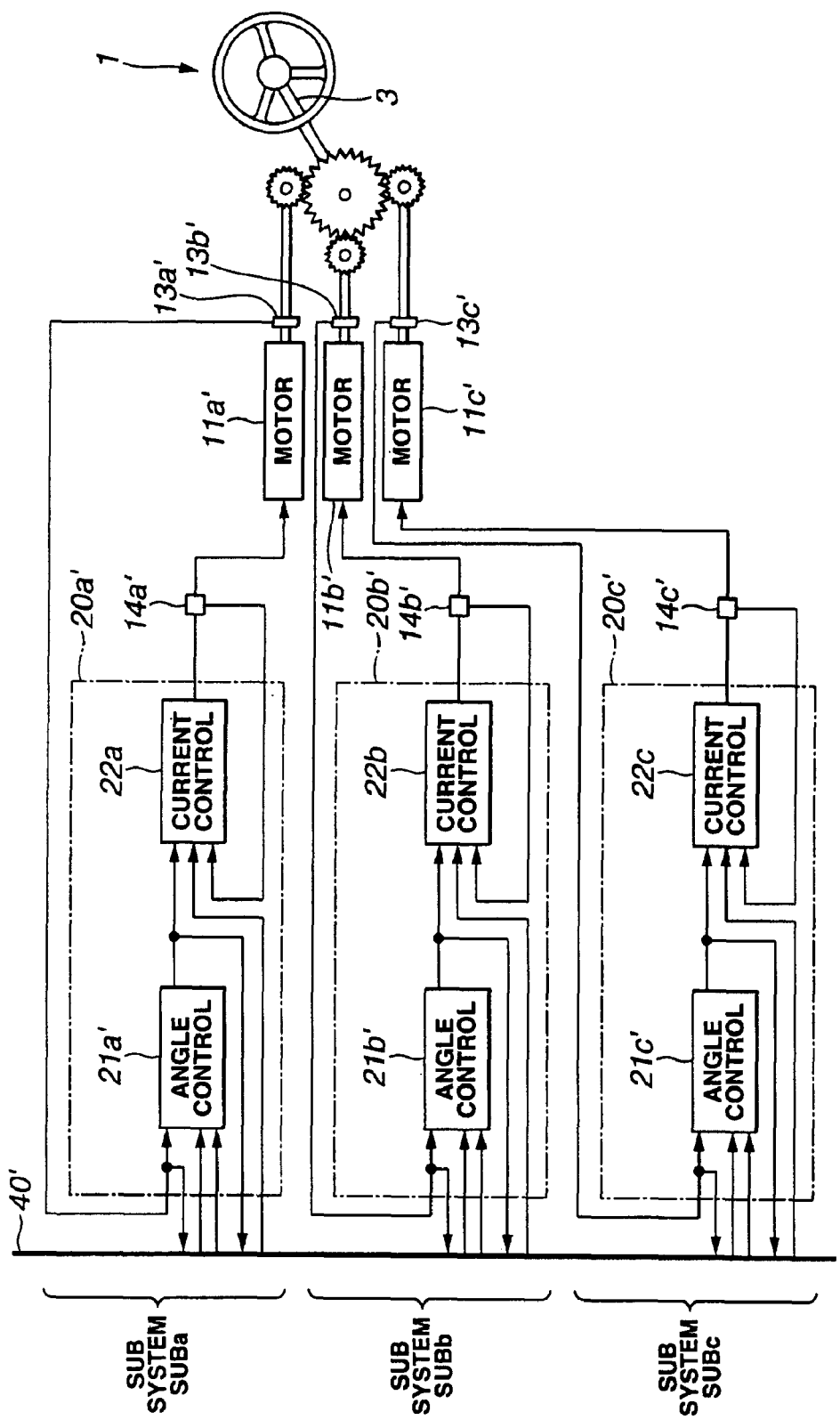
FIG. 7 is a schematic view showing a steering actuating system of a steering system according to a second embodiment in which the present invention is applied to a reaction mechanism 50 shown in FIG. 1.

FIG. 7 shows a vehicle steering system according to a second embodiment of the present invention. In the second embodiment, a steering actuating unit or system is provided for the reaction unit 50 of the input section including steering wheel 3. Actuating system 10 of this example is composed of a plurality of subsystems which are three in number in the illustrated example of FIG. 7. Each subsystem includes a drive unit including a reaction producing motor 11a', 11b' or 11c', and a control unit including a reaction producing controller 20a', 20b' or 20c' for controlling the drive unit.

Each of the reaction producing controllers 20a', 20b' and 20c' is composed of an angle control operational section 21a', 21b' or 21c' and a current control operational section 22a', 22b' or 22c'. Angle control operational sections 21a', 21b' and 21c' are arranged to perform an angle control calculation in accordance with information obtained by angle sensors 13a', 13b' and 13c' and a target rotation angle of column shaft 3 of steering wheel 1 corresponding to a target reaction torque calculated by upper controller 60. In accordance with a current command calculated by the angle control calculation by one of angle control operational sections 21a'~21c', and a supply current sensed by one of current sensors 11a'~11c', each of current control operational sections 22a, 22b and 22c calculates a drive current to control the actual current for the corresponding one of reaction producing motors 11a', 11b' and 11c' toward the current command. Current corresponding to the thus-determined magnitude is supplied to the corresponding reaction producing motor.

In the second embodiment, too, one of the subsystems serves as a representative unit, and calculates a current command per subsystem. Each subsystem serving as non-representative unit obtains the current command per subsystem from the subsystem of the highest priority, and controls the corresponding reaction producing motor 11a, 11b or 11c.

Steps S12~S22 correspond to a process element of calculating a common torque share when an assigned role is to serve as a representative unit. Step S24, S26 and S28 correspond to a process element of receiving the common torque share when the assigned role is to serve as a non-representative unit. Steps S30~S34 correspond to a process element of controlling the steering torque in accordance with the common torque share. Steps S2~S10 corresponds to means for selecting one of subsystems as a representative unit, and leaving the remainder as a non-representative unit. Step S18 corresponds to means for causing the representative unit to calculate a common torque share in accordance with the target torque. Step S28 corresponds to means for causing the non-representative unit to receive the common torque share from the representative unit. Steps S30~S34 correspond to means for producing the actual torque in response to the driver's steering input for steering the vehicle, by causing each unit to produce a torque in accordance with the common torque share. Each of the angle sensors 13a, 13b and 13c (or 13a', 13b' and 13c') serves as an operating condition sensor to sense an operating quantity of the steering mechanism.

This application is based on a prior Japanese Patent Application No. 2002-255072 filed on Aug. 30, 2002. The entire contents of this Japanese Patent Application No. 2002-255072 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle steering system comprising:
   a steering mechanism including an input section, and a steering section which is mechanically separated from the input section, and arranged to steer a vehicle in accordance with a steering input quantity of the input section;
   an actuating section to impart an actual torque to the steering mechanism, the actuating section including a plurality of drive units to produce the actual torque; and
   a controlling section to control the actuating section to achieve a target torque with the drive units, the controlling section including a plurality of control units one of which serves as a representative unit calculating a common torque share from the target torque, and all of which control the drive units, respectively, in accordance with the common torque share calculated by the representative unit.

2. The vehicle steering system as claimed in claim 1, wherein the control units are connected with one another by a communication line, and arranged to exchange information on the common torque share calculated by one of the control units.

3. The vehicle steering system as claimed in claim 1, wherein each of the control units is configured to select a role between a representative unit for calculating the common torque share and transmitting the common torque share, and a non-representative unit for receiving the common torque share from the representative unit.

4. The vehicle steering system as claimed in claim 3, wherein each of the control units is configured to detect an operating condition in the unit, to send information on the operating condition through the communication line, and to determine the role between the representative unit and the non-representative unit, in accordance with the operating conditions of the control units.

5. The vehicle steering system as claimed in claim 4, wherein each of the control units is configured to detect an abnormal state in the unit, to send information on the abnormal state through the communication line, and to determine the role between the representative unit and the non-representative unit, in accordance with a predetermined order of priority among the control units, excluding one or more control units, if any, which are in the abnormal state.

6. The vehicle steering system as claimed in claim 1, wherein the actuating section is provided for the steering section, and arranged to impart the actual torque to the steering section.

7. The vehicle steering system as claimed in claim 1, wherein the input section includes a reaction producing mechanism; and the actuating section is provided for the reaction producing mechanism of the input section, and arranged to impart the actual torque to the reaction producing mechanism.

8. The vehicle steering system as claimed in claim 1, wherein the controlling section comprises an upper controller section which determines a target steering angle in accordance with a vehicle operating condition, and the representative unit calculates the target torque in accordance with the target steering angle determined by the upper controller section and a sensed actual steering angle.

9. The vehicle steering system as claimed in claim 1, wherein the control units use the common torque share in common, and produce equal torques with the drive units in accordance with the common torque share calculated by the representative unit.

10. The vehicle steering system as claimed in claim 1, wherein the steering mechanism includes a rack and pinion steering gear mechanism and the drive units are arranged to drive a pinion of the rack and pinion steering gear mechanism in cooperation.

11. A vehicle steering system comprising:
    a steering mechanism including an input section, and a steering section which is mechanically separated from the input section, and arranged to steer a vehicle in accordance with a steering input quantity of the input section;
    an actuating section to impart an actual torque to the steering mechanism, the actuating section including a plurality of drive units to produce the actual torque; and
    a controlling section to control the actuating section to achieve a target torque with the drive units, the controlling section including a plurality of control units to control the drive units, respectively, in accordance with a common torque share calculated by one of the control units,
    wherein each of the control units is configured to select a role between a representative unit for calculating the common torque share and transmitting the common torque share, and a non-representative unit for receiving the common torque share from the representative unit,
    wherein each of the control units is configured to detect an operating condition in the unit, to send information on the operating condition through the communication line, and to determine the role between the representative unit and the non-representative unit, in accordance with the operating conditions of the control units,
    wherein each of the control units is configured to detect an abnormal state in the unit, to send information on the abnormal state through the communication line, and to determine the role between the representative unit and the non-representative unit, in accordance with a predetermined order of priority among the control units, excluding one or more control units, if any, which are in the abnormal state, and
    wherein each of the control units, when serving as the representative unit, calculates the common torque share in accordance with the number of control unit or control units which are not in the abnormal state.

12. The vehicle steering system as claimed in claim 11, wherein each of the control units is configured to stop operation of the drive unit assigned to the control unit if the abnormal state is detected in the control unit.

13. A vehicle steering system comprising:
    a steering mechanism including an input section, and a steering section which is mechanically separated from the input section, and arranged to steer a vehicle in accordance with a steering input quantity of the input section;
    an actuating section to impart an actual torque to the steering mechanism, the actuating section including a plurality of drive units to produce the actual torque; and
    a controlling section to control the actuating section to achieve a target torque with the drive units, the controlling section including a plurality of control units to control the drive units, respectively, in accordance with a common torque share calculated by one of the control units, wherein each of the control units is configured to select a role between a representative unit for calculating the common torque share and transmitting the common torque share, and a non-representative unit for receiving the common torque share from the representative unit, and wherein each of the control units comprises an operating condition sensor to sense an operating quantity of the steering mechanism, and each control unit, when serving as the representative unit, calculates the common torque share in accordance with the operating quantity sensed by the operating condition sensor within the control unit.

14. The vehicle steering system as claimed in claim 13, wherein each of the control units is configured to calculate a control command quantity in accordance with the operating condition sensed by the operating condition sensor within the control unit and further to calculate the common torque share in accordance with the control command quantity when the control unit is to serve as the representative unit; and each of the control units is configured to calculate the control command quantity even when the control unit is to serve as the non-representative unit.

15. The vehicle steering system as claimed in claim 14, wherein each of the control units is configured to calculate the control command quantity in accordance with the target torque and the operating quantity sensed by the operating quantity sensor within the control unit when the control unit is to serve as the representative unit; and each of the control units is configured to calculate the control command quantity in accordance with the target torque and the operating quantity sensed by the operating quantity sensor of the representative unit and sent from the representative unit when the control unit is to serve as the non-representative unit.

16. The vehicle steering system as claimed in claim 14, wherein each of the control units, when serving as the representative unit, determines the common torque share by dividing the control command quantity by the number of the control units which are not in the abnormal state.

17. A control process for controlling a vehicle steering system including:

a steering mechanism including an input section, and a steering section which is mechanically separated from the input section, and arranged to steer a vehicle in accordance with a steering input quantity of the input section;

an actuating section to impart an actual torque to the steering mechanism, the actuating section including a plurality of drive units to produce the actual torque; and a controlling section to control the actuating section to achieve a target torque with the drive units, the controlling section including a plurality of control units to control the drive units, respectively;

the control process comprises:

selecting one of the control units as a representative unit;

causing the representative unit to calculate a common torque share in accordance with a target torque; and producing the actual torque by causing all the control units to control the drive units, respectively in accordance with the common torque share calculated by the representative unit.

* * * * *